(12) United States Patent
Esteves et al.

(10) Patent No.: US 7,228,148 B2
(45) Date of Patent: Jun. 5, 2007

(54) METHODS AND APPARATUS FOR POWER ALLOCATION ON A REVERSE LINK POWER CONTROL CHANNEL OF A COMMUNICATION SYSTEM

(75) Inventors: Eduardo A. S. Esteves, Del Mar, CA (US); Peter J. Black, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 641 days.

(21) Appl. No.: 10/679,990

(22) Filed: Oct. 6, 2003

(65) Prior Publication Data

US 2004/0067767 A1  Apr. 8, 2004

Related U.S. Application Data

(63) Continuation of application No. 09/832,671, filed on Apr. 11, 2001, now Pat. No. 6,687,510, which is a continuation of application No. 09/267,565, filed on Mar. 12, 1999, now abandoned.

(51) Int. Cl.
*H04Q 7/20* (2006.01)
*H04B 7/00* (2006.01)
*H01Q 11/12* (2006.01)

(52) U.S. Cl. .................. 455/522; 455/69; 455/127.1

(58) Field of Classification Search ............... 455/522, 455/69, 127.1, 70; 370/252, 318, 335
See application file for complete search history.

(56) References Cited

U.S. PATENT DOCUMENTS

| 4,763,322 A | 8/1988 | Eizenhofer |
| 5,224,120 A | 6/1993 | Schilling |
| 5,442,625 A | 8/1995 | Gitlin et al. |
| 5,490,136 A | 2/1996 | Sereno et al. |
| 5,537,410 A | 7/1996 | Li |
| 5,619,492 A | 4/1997 | Press et al. |
| 5,648,955 A | 7/1997 | Jensen et al. |
| 5,729,534 A | 3/1998 | Jokinen et al. |

(Continued)

FOREIGN PATENT DOCUMENTS

EP       0719062       6/1996

(Continued)

*Primary Examiner*—Tilahun Gesesse
(74) *Attorney, Agent, or Firm*—Thomas R. Rouse; Thien T. Nguyen; Lee Hsu (57) ABSTRACT

A method and apparatus that determines how much power to allocate to each of a plurality of reverse link power control (RLPC) Channels to be transmitted from a base station, based upon data rate control (DRC) messages transmitted to the base station. Historical information is used to determine the quality of the Forward Link over which the RLPC is to be transmitted. If the history of the DRCs received indicates that the remote station to which the RLPC Channel is to be directed has not transmitted a DRC recently, then the base station allocates power to the RLPC Channels based upon information provided to the base station in DRCs that were received by the base station, but that were directed to other base stations. Accordingly, the base station can allocate power among the RLPC Channels without having received explicit information as to the quality of the Forward Link between the base station and every remote station intended to receive the information on the RLPC Channels.

6 Claims, 7 Drawing Sheets

U.S. PATENT DOCUMENTS

| | | | |
|---|---|---|---|
| 5,734,646 A | 3/1998 | I et al. | |
| 5,933,781 A | 8/1999 | Willenegger | |
| 6,058,107 A | 5/2000 | Love et al. | |
| 6,118,983 A | 9/2000 | Egusa | |
| 6,137,840 A | 10/2000 | Tiedemann | |
| 6,205,129 B1 | 3/2001 | Esteves et al. | |
| 6,377,814 B1 * | 4/2002 | Bender | 455/522 |
| 6,678,257 B1 * | 1/2004 | Vijayan et al. | 370/320 |
| 6,687,510 B2 * | 2/2004 | Esteves et al. | 455/522 |
| 7,085,581 B2 * | 8/2006 | Vanghi | 455/522 |

FOREIGN PATENT DOCUMENTS

| | | |
|---|---|---|
| EP | 0782364 | 7/1997 |
| EP | 0847147 | 6/1998 |
| EP | 0817400 | 7/1998 |
| WO | 9401975 | 1/1994 |
| WO | 9507578 | 3/1995 |
| WO | 9521494 | 8/1995 |
| WO | 9524102 | 8/1995 |
| WO | 9610305 | 4/1996 |
| WO | 9637081 | 11/1996 |

* cited by examiner

FIG. 1  PRIOR ART

PRIOR ART

METHODS AND APPARATUS FOR POWER ALLOCATION ON A REVERSE LINK POWER CONTROL CHANNEL OF A COMMUNICATION SYSTEM

CLAIM OF PRIORITY UNDER 35 U.S.C. §120

The present Application for Patent is a Continuation Application and claims priority to co-pending U.S. application Ser. No. 09/832,671, entitled "METHODS AND APPARATUS FOR POWER ALLOCATION ON A REVERSE LINK POWER CONTROL CHANNEL OF A COMMUNICATION SYSTEM," filed Apr. 11, 2001, now U.S. Pat. No. 6,687,510, issued Feb. 3, 2004, and assigned to the assignee hereof and hereby expressly incorporated by reference herein, and which is a Continuation Application of U.S. application Ser. No. 09/267,565, entitled "METHODS AND APPARATUS FOR POWER ALLOCATION ON A REVERSE LINK POWER CONTROL CHANNEL OF A COMMUNICATION SYSTEM," filed Mar. 12, 1999, now abandoned, and also assigned to the assignee hereof and hereby expressly incorporated by reference herein.

BACKGROUND

1. Field

The present invention relates generally to mobile radio telephone systems. More specifically, the present invention relates to systems and methods for controlling the amount of power that will be transmitted from a base station to a remote station in a communication system.

2. Background

It has recently become more common to use spread spectrum techniques, such as code division multiple access (CDMA) techniques, to communicate information over wireless communication systems. For example, CDMA techniques are in wide use for communications between stationary base stations and mobile cellular telephones in a cellular telephone network. In accordance with CDMA techniques, several streams of information, typically from different sources, are each encoded (or "Channelized") using a different code. These codes allow the information to be transmitted over the same frequency band (commonly referred to as a "CDMA channel"). Each such Channelized information stream is commonly referred to as a "Code Channel."

It is presently well known that in order to minimize the amount of interference between Code Channels of a CDMA channel, the amount of power that is transmitted on each of the Code Channels must be carefully controlled. Furthermore, it is common for a single amplifier to be responsible for transmitting the entire CDMA channel. When a single amplifier is used to transmit an entire CDMA channel, the more power transmitted in one Code Channel, the less power is available to the other Code Channels. This is because there is typically a limit on the amount of total output power that such an amplifier can provide without undesirably distorting the amplified signals. For at least these reasons, it is important to properly allocate transmit power to each Code Channel in the same CDMA channel.

In one system used primarily for transmitting information at high data rates over a wireless communication link, all of the Code Channels in one direction are used to provide parallel data paths for information from a first end point to a second end point of the communication link. For example, information transmitted from a base station to one particular remote station is transmitted over all of the Code Channels. The transmission path in this direction is commonly referred to as either the "Forward Link" or "Down Link." In such a high data rate system, each Code Channel on the Forward Link is allocated approximately the same amount of power for transmission from the base station. Furthermore, transmissions to different remote stations are time multiplexed. That is, during a first time slot, all of the Code Channels of the CDMA Channel are allocated to transmitting information to a first remote station. During a second time slot, all of the Code Channels of the CDMA Channel are allocated to transmitting information to a second remote station. Additional time slots provide communication links between the base station and other remote stations.

The data path by which information is transmitted from a particular remote station to the base station is commonly referred to either as the "Reverse Link" or the "Up Link." In one high data rate system, the Code Channels of a Reverse Link are each allocated to different remote stations. The amount of power that is used to transmit the information on the Reverse Link must be controlled to reduce interference at the receiving base station between Code Channels of the same CDMA channel.

Accordingly, portions of each Code Channel on the Forward Link are reserved for transmitting power control information. The reserved portions of a particular Code Channel within one slot form a "Reverse Link Power Control (RLPC) Channel." Each such RLPC Channel on the Forward Link is associated with one remote station. The power control information that is transmitted on a particular RLPC Channel is intended to be received and used by one particular remote station to control the reverse link power transmitted by that particular remote station. The power control information assists in maintaining the output power from each remote station at a minimum level required for information to be reliably received from each remote station on the Reverse Link.

Figure 1:
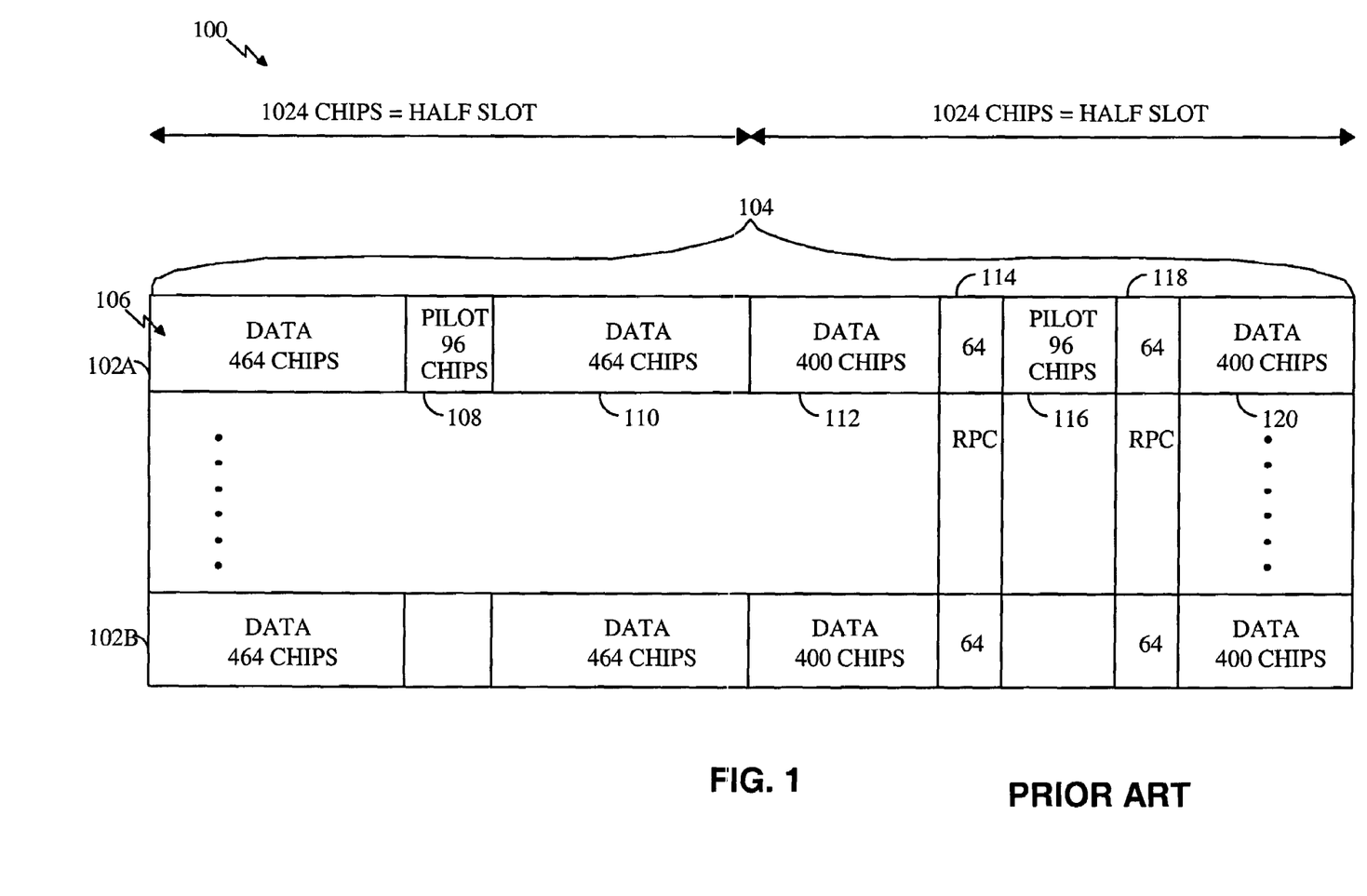
FIG. 1 is an illustration of the format of a Forward Link of one particular communication system.

FIG. 1 is an illustration of the format of a Forward Link of one particular communication system. In the system shown in FIG. 1, a portion of each Code Channel forms a RLPC Channel over which reverse power control information is transmitted.

FIG. 1 shows the Forward Link 100 formatted in Code Channels 102. Two Code Channels 102A and 102B are explicitly shown in FIG. 1. However, in accordance with the format shown in FIG. 1, 32 Code Channels are provided on the Forward Link CDMA channel. Each Code Channel is divided into "Slots" 104. In a typical system, such as the one shown in FIG. 1, each Slot 104 in the Forward Link has a predetermined duration. Each Slot is assigned to a particular remote station. In the system shown in FIG. 1, each Slot comprises 2048 Chips." A Chip is defined as a duration in time that is equal to the duration of one bit of the code used to channelize the Code Channels. Each Slot 104 begins with a first data field 106 that is 464 Chips in length. A pilot field 108 follows the first data field 106. The pilot field is 96 chips in length. The pilot field 108, among other uses, allows the receiving device to synchronize to the phase of the incoming Forward Link signals (which include the pilot field 108 itself). A second data field 110 having a length of 464 Chips is then transmitted. A third data field 112 having a length of 400 Chips is transmitted next. Following the third data field 112, a power control field 114 is transmitted. The first power control field 114 has a length of 64 Chips. Next, a second pilot field 116 having a length of 96 Chips is transmitted, followed by a second power control field 118 having a length of 64 Chips. The last field in the Slot 104 is a fourth data field 120 having a length of 400 Chips.

The power control fields 114 and 118 within one Code Channel 102 form one RLPC Channel. Accordingly, the RLPC Channel is "Embedded" in the Data. Under most conditions, a determination can be made at the base station as to whether more, less, or the same amount of power needs to be transmitted over the Reverse Link transmitted from a remote station. The determination is made based on the strength of the signal received by the base station from a particular remote station.

Typically, when transmitting the Forward Link, the same amount of power is used to transmit each Code Channel in the CDMA channel. It is appropriate to transmit the Code Channels at the same power, since the Data is essentially directed to one remote station. For the purposes of this description, "Data" is defined as information that is provided by the communication system user, and does not include information that is transmitted between components of the system in order to manage and/or support system operations (such as overhead messages). However, since each RLPC Channel is directed to a different remote station, transmitting each RLPC Channel of the CDMA channel at the same power level means that some of the RLPC Channels will be transmitted at power levels that are either greater than or less than is required. This is because the amount of power that is required to transmit to a remote station that is closer is less than the amount of power required to transmit to a remote station that is farther away. Accordingly, it can be seen that transmitting all RLPC Channels at the same power level is undesirable for the following reason. There is an absolute maximum total amount of power that can be transmitted by all of the RLPC Channels taken together. Therefore, using more power than required for some RLPC Channels means that other RLPC Channels will get less power than might otherwise be possible if the power were allocated based on the actual requirements of each RLPC Channel rather than being allocated equally to all RLPC Channels. This could be problematic if the farthest remote station requires more power than 1/N, where N is the total number of RLPC Channels. It should be noted that the amount of power "required" to "reliably" transmit information, as referred to herein, is the amount of power that is needed to ensure that the information can be decoded with a predetermined error rate. The particular error rate depends upon the particular application of the disclosed method and apparatus.

Figure 2:
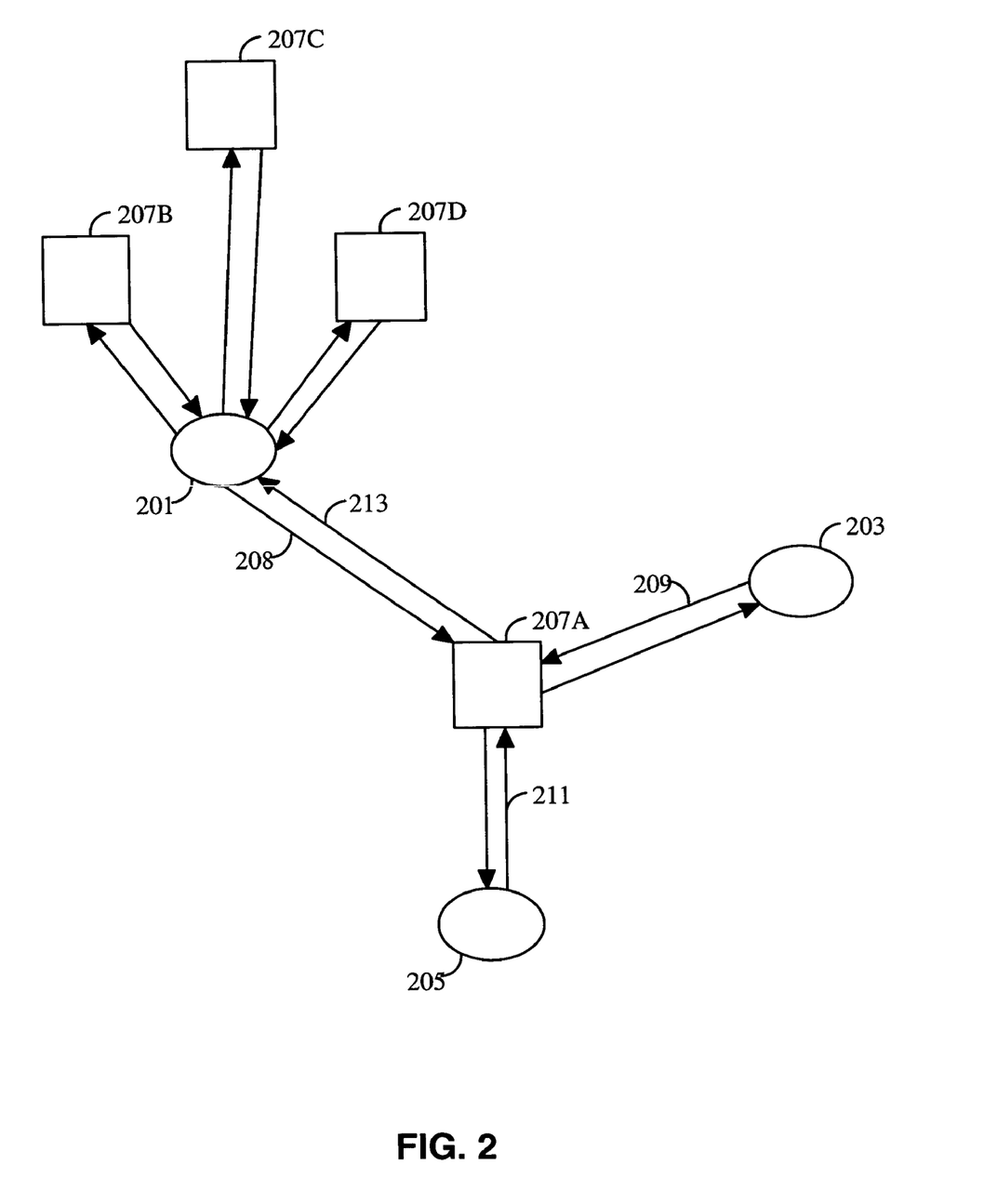
FIG. 2 shows a communication system that includes seven stations.

However, determining the amount of power that is required by each RLPC Channel is difficult for some base stations from which transmission of RLPC information would be desirable. This can be understood from the following example. FIG. 2 is an illustration of a system including three base stations 201, 203, and 205 and four remote stations 207A–207D. Each of remote stations 207A–207D typically maintains a list (commonly referred to as the "Active Set") of base stations from which the Forward Link 208 to that remote stations 207A, 207B, 207C, or 207D may originate. However, the Forward Link 208 will only originate from one of the base stations in the Active Set at any one time. The transmission paths 209 and 211 between those base stations 203 and 205, which are not transmitting the Forward Link 208 to the remote station 207A typically has different loss characteristics than the transmission path 213 between the base station 201 that is transmitting the Forward Link 208 and the remote station 207A. Since nothing is being transmitted to the remote station 207A from the other base stations 203 and 205 in the Active Set, it is not possible to characterize the loss over the Forward Links 209 and 211 between the other base stations 203 and 205, and the remote station 207A. Nonetheless, the remote station 207A will be transmitting to the other base stations 203 and 205. Therefore, it is desirable to have each base station 201, 203, and 205 in the Active Set send reverse link power control information to the remote station 207A so that the remote station will have information regarding the amount of power to send if selected to transmit.

Therefore, a need currently exists for a method and apparatus to determine the relative amount of power that should be used to transmit reverse link power control information from a base station that is in the Active Set of a remote station, but which is not transmitting a Forward Link signal to that remote station.

These problems and deficiencies are recognized and solved by the present invention in the manner described below.

SUMMARY

The disclosed method and apparatus determines how much power to allocate to each of a plurality of reverse link power control (RLPC) Channels to be transmitted from a base station, based upon data rate control (DRC) messages transmitted to the base station. However, since base stations transmit RLPC Channels to remote stations that have not necessarily transmitted a DRC to the transmitting base station, historical information is used to determine the quality of the Forward Link over which the RLPC is to be transmitted. It should be noted that for the purpose of this document, quality is directly proportional to the amount of power required to reliably transmit a predetermined amount of information in a predetermined amount of time with a predetermined error rate. If the history of the DRCs received indicates that the remote station to which the RLPC Channel is to be directed has not transmitted a DRC directed to that base station recently, then the base station allocates power to the RLPC Channels based upon information provided to the base station in DRCs that were received by the base station, but that were directed to other base stations. Accordingly, the base station can allocate power among the RLPC Channels without having received explicit information as to the quality of the Forward Link between the base station and every remote station intended to receive the information on the RLPC Channels.

BRIEF DESCRIPTION OF THE DRAWINGS

The features, objects and advantages of the present invention will become more apparent from the detailed description set forth below when taken in conjunction with the drawings in which like reference characters identify like elements.

DETAILED DESCRIPTION

The method and apparatus that is disclosed in this document allows a first station (such as a base station within a communication system) to determine how much power to allocate to each "Reverse Link Power Control (RLPC) Channel" that is being transmitted by the first station. For the purpose of this document, a RLPC Channel is defined as any portion of a communication path that is used to communicate information from a first station to a second station regarding the amount of power the receiving second station should transmit back to the first station. A "Forward Link" is defined as a communication link transmitted from a first station to a second station. A "Reverse Link" is defined as the communication link transmitted from the second station to the first station. A "Base Station" is defined as a fixed transmitting and receiving station for interfacing a wireless communications device to a wireline communications system. A "Remote Station" is defined as a station that communicates with a Base Station over a wireless link.

FIG. 2 shows a communication system that includes seven stations 201, 203, 205, 207A, 207B, 207C, and 207D. In accordance with one embodiment of the disclosed method and apparatus, the first, second and third stations 201, 203, and 205 are Base Stations. The fourth, fifth, sixth, and seventh stations 207A–207D are Remote Stations (such as a wireless local loop telephone, a hand held telephone, a modem, a computer terminal, or another device or system used to originate information to be transmitted over the communication system). It should be understood that the number of Remote Stations is typically much greater than the number of Base Stations. However, only four Remote Stations 207A–207D are shown in FIG. 2 for the sake of simplicity. It should be understood that each station may be either a Remote Station or a Base Station, depending upon the type of communication system in which these stations are being used.

The disclosed method and apparatus is described essentially in the context of allocation of power among RLPC Channels. However, in systems in which the roles of the Forward and Reverse Links are reversed from that set forth in this description, the disclosed method and apparatus applies equally well to the allocation of power among "Forward Link Power Control Channels." Nonetheless, for ease and clarity, the disclosed method and apparatus is described in the context of allocation of power to RLPC Channels transmitted in the Forward Link.

In accordance with one embodiment of the disclosed method and apparatus, multiple Remote Stations concurrently transmit Data over the Reverse Link to one Base Station. This Data is transmitted from each Remote Station to a Base Station on a separate Code Channel. For example, the four Remote Stations 207A–207D may each be transmitting information over the Reverse Link to the Base Station 201.

In the context of one system for allocating power among RLPC Channels, a Base Station transmits Data on a Forward Link to one Remote Station at a time. In addition, each Remote Station preferably receives Data from only one Base Station at a time. For the purposes of this description, "Data" is defined as information that is provided by the communication system user, and does not include information that is transmitted between components of the system in order to manage and/or support system operations (such as overhead messages).

Each Remote Station maintains a "Set" (or list) of "Active" Base Stations (i.e., an "Active Set"). A Base Station is placed in the Active Set if that Base Station is transmitting a Forward Link that is being received by the Remote Station 207 with at least a predetermined level of quality. In one embodiment, the quality of the Forward Link is determined by the quality of portions pilot 108 and pilot 116 of the Forward Link 100, referred to as the "Pilot Channel." A Pilot Channel is preferably made up of portions pilot 108 and pilot 116 of the Forward Link that are used by a Remote Station to determine the quality of the Forward Link and to determine the relative phase of the information being received by a Remote Station. In accordance with the embodiment of the disclosed method and apparatus shown in FIGS. 1 and 2, the Pilot Channel is transmitted on only one Code Channel 102A from among the Code Channels 102A and 102B in the CDMA channel. Furthermore, the Pilot Channel is transmitted only during two pilot fields 108 and 116 of each Slot 104.

The quality of the Pilot Channel may be determined by measuring a ratio of signal-to-noise, frequently referred to as "Carrier/Interference" or "C/I." Such measurements of the quality of the Pilot Channel are well known to those skilled in the art. The quality of the Pilot Channel can be used to determine the quality of the entire Forward Link. It should be understood that the quality of the Forward Link may be determined by any other means known, such as by measuring the signal-to-noise ratio of a Forward Link "Traffic Channel" (i.e., that portion of the Forward Link that carries the Data). Alternatively, any other portion of the Forward Link may be used to determine the quality of the Forward Link. However, since the Pilot Channel is modulated in a predetermined manner, the Pilot Channel provides an appropriate channel for determining the quality of the Forward Link. Nonetheless, the signal-to-noise ratio is only one parameter that can be used by the Remote Station to determine the quality of the Forward Link. Any other method for determining the quality of the Forward Link can be used in accordance with the disclosed method and apparatus.

If the quality of the Forward Link received by a Remote Station is such that Data can be transmitted over the Forward Link at a predetermined data rate with a predetermined reliability, then the transmitting Base Station may be placed in the Remote Station's Active Set. However, in accordance with one embodiment of the disclosed method and apparatus, a Pilot Channel from a particular Base Station may be received by the Remote Station with sufficient quality and still not be added to the Active Set. This may be true if there is a predetermined number of Active Base Stations already in the Active Set and the Active Set can only support the predetermined number of Active Base Stations. In the embodiment of the disclosed method and apparatus in which C/I is used to determine the quality of the Forward Link, the Remote Station 207 calculates a data rate based upon the C/I of the pilot received from the selected Base Station. The data rate is calculated to result in Data being received at the Remote Station with a predetermined reliability. It will be understood by those skilled in the art that the reliability with which Data can be transmitted depends upon the quality of the Forward Link (i.e., the C/I) and the data rate.

Since the Remote Station only receives data from one of the Base Stations in the Active Set at any one time, the Remote Station selects one of the Base Stations in the Active Set to transmit data to the Remote Station. The selected Base Station 201 is preferably the Base Station 201 from which the Remote Stations 207A, 207B, 207C, or 207D receive the best quality Forward Link (i.e., the Base Station transmitting the Forward Link capable of supporting the highest data rate). In accordance with one embodiment of the disclosed method and apparatus, the rate at which the selected Base Station can reliably transmit Data to a particular Remote Station is communicated to the selected Base Station by the particular Remote Stations 207A, 207B, 207C, or 207D over the Reverse Link 213. The data rate is encoded with a unique code that indicates for which Base Station the data rate information is intended.

When the selected Base Station receives the data rate information, the selected Base Station uses this information to determine the C/I of the pilot that was received by the transmitting Remote Station. In accordance with one embodiment of the disclosed method and apparatus, the method used by the selected Base Station to calculate the C/I of the Forward Link transmitted from the data rate is the inverse of the method used by the Remote Station to calculate the data rate from the measured C/I of the Forward Link pilot signal.

The selected Base Station determines the amount of power to allocate to a particular RLPC Channel based upon the quality of the Forward Link as determined by the Remote Station. In accordance with the embodiment shown in FIGS. 1 and 2, the Forward Link can support as many RLPC Channels as there are Code Channels 102A and 102B. Each such RLPC Channel is intended for a different Remote Station. The number of RLPC Channels to be transmitted by a Base Station is equal to the number of Remote Stations that include that Base Station in their Active Set. For example, if only three Remote Stations 207A, 207B, and 207C have a particular Base Station 201 in their Active Set, then the Base Station 201 transmits a Forward Link 208 that includes three RLPC Channels, one RLPC Channel intended for each of the three Remote Stations 207A, 207B, and 207C that include that Base Station in the Active Set.

The Base Station also receives information over the Reverse Link from each of these three Remote Stations 207A, 207B, and 207C. Accordingly, the receiving Base Station 201 must provide power control information to each of the three Remote Stations 207A, 207B, and 207C. This information is provided in a power control message over the RLPC Channels. Each such RLPC Channel is transmitted over one Code Channel during the two power control fields 114 and 118 of each Slot. No power is allocated to the unused RLPC Channels (i.e., to the other Code Channels during the power control fields 114 and 118). Therefore, if the Forward Link uses a CDMA channel that includes 32 Code Channels, only three of the 32 Code Channels are required during the reverse link power control fields 114, and 118 (assuming that the Base Station is included in the Active Sets of only three Remote Stations). Accordingly, no power would be transmitted on the other 29 Code Channels of the Forward Link. This allows the maximum amount of power to be allocated to the three RLPC Channels that are directed to Remote Stations 207A, 207B, and 207C that include the Base Station 201 in their Active Set. Each Remote Station 207A, 207B, and 207C determines which particular power control message is intended for that Remote Station based upon the particular Code Channel 102A or 102B over which the message is sent (i.e., the particular Code Channel 102A or 102B that is used to support the RLPC Channel).

It can be seen that the allocation of power among the RLPC Channels requires that the Base Station identify each Remote Station that includes the Base Station in the Active Set. In addition, the Base Station must determine the quality of the RLPC Channel in order to determine the amount of power to allocate to each of the RLPC Channels. In accordance with the disclosed method and apparatus, the Remote Station transmits an overhead message over the Reverse Link that indicates when a new Base Station has been added to the Active Set. A Base Station that is added to the Active Set of a Remote Station will receive overhead messages, either directly from the Remote Station or through another Base Station which then communicates the information to the Base Station that has been added. Therefore, a Base Station can maintain a list of those Remote Stations, which include that Base Station in their Active Set.

However, each Remote Station preferably only transmits information regarding the quality of one Forward Link. That is, a Remote Station only transmits information regarding the Forward Link between that Remote Station and the one Base Station that is currently selected by that Remote Station to transmit data to that Remote Station. For example, assume that the Active Set of the Remote Station 207A includes the three Base Stations 201, 203, and 205. Remote Station 207A transmits the data rate at which that Remote Station 207A can receive Data from the Base Station 201, assuming that the Forward Link between the Base Station 201 and the Remote Station 207A has a higher quality than the other two Forward Links 209 and 211. This data rate information can be used to determine the quality of the Forward Link 208 (and so the quality of the RLPC Channel). However, while the Base Stations 203 and 205 receive the data rate information transmitted from the Remote Station 207A, the data rate information is only relevant to the Forward Link 208 between the select Base Station 201 and the Remote Station 207A. Therefore, the other Base Stations 203, 205 in the Active Set have no information about the current quality of the Forward Links 209, 211 between them and the Remote Station 207A.

Rather than allocating power among the RLPC Channels either arbitrarily or equally, the disclosed method and apparatus uses historical information to assist in determining the quality of each of the RLPC Channels to be transmitted.

Figure 3A:
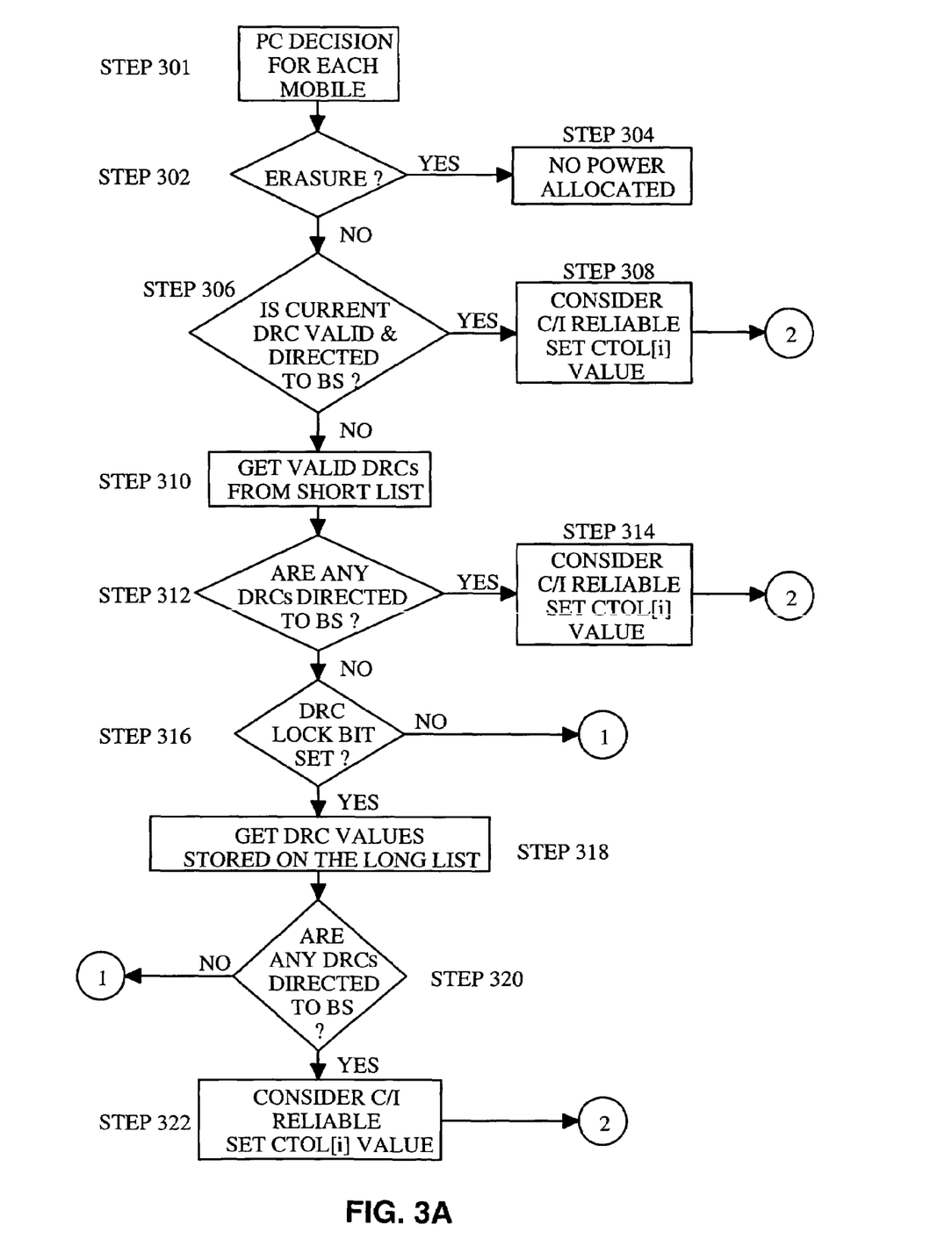
FIGS. 3A–3C describe the disclosed method and apparatus from the perspective of one base station.
Figure 3B:
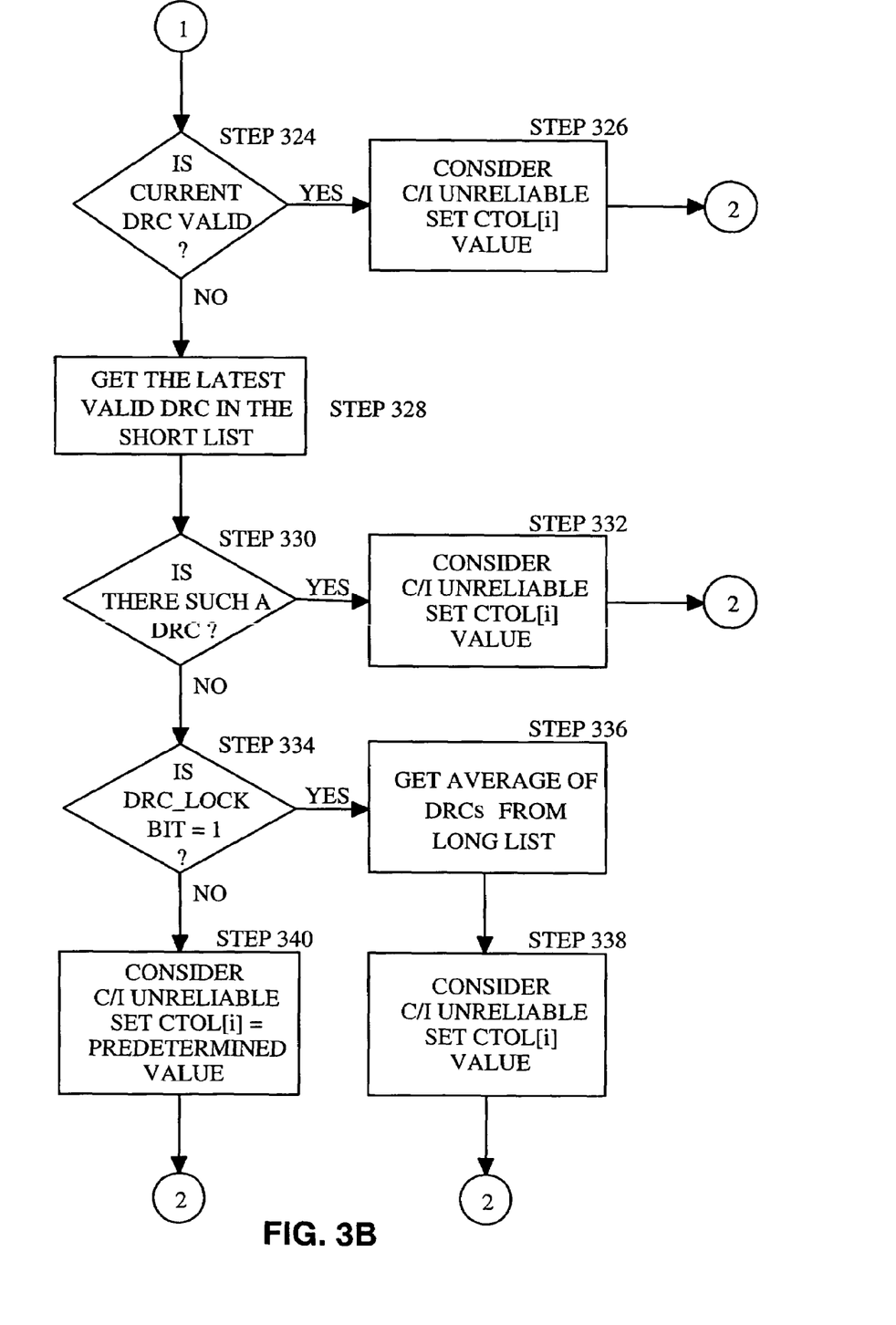
Figure 3C:
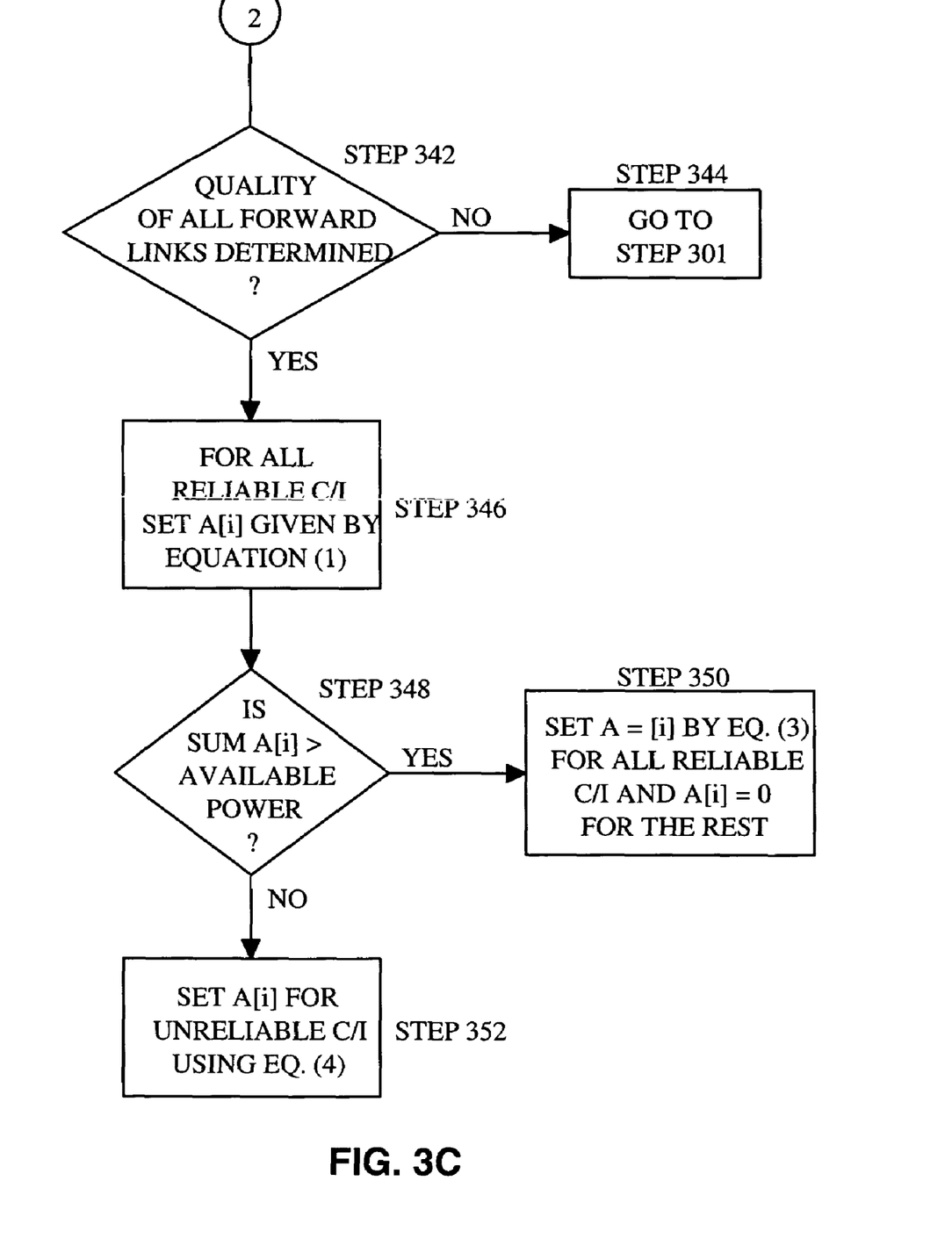

FIGS. 3A–3C are flowcharts of the steps performed in accordance with one disclosed method for determining the amount of power to allocate to each RLPC Channel. The method illustrated in FIGS. 3A–3C is performed independently by each Base Station in a communication system. The steps of FIGS. 3A–3C are described below from the perspective of one Base Station 201.

For the purpose of this description, it will be assumed that the Base Station 201 is receiving Data from three Remote Stations 207A, 207B, and 207C. In addition, it is assumed that the Active Set of these three Remote Stations 207A, 207B, and 207C include the Base Station 201. The Base Station 201 receives "Data Rate Control" (DRC) messages over a Reverse Link 213 associated with the first Remote Station 207A. The Base Station 201 stores the received DRC messages in both a "Short List" and a "Long List." In accordance with one method, the Short List includes the five most recently received DRC messages and the Long List includes the twenty most recently received DRC messages. It should be understood that in one embodiment of the disclosed method and apparatus, the Long List includes the five DRC messages stored in the Short List. However, in an alternative embodiment, the Long List includes only those twenty DRC messages that were received before receipt of the five DRC messages stored in the Short List. In yet another alternative embodiment of the disclosed method and apparatus, any other number of DRC messages may be stored in the Long and Short Lists. However, it should be clear that the number of DRC messages stored in the Short List should be less than the number stored in the Long List. Furthermore, it should be understood that the greater the number of messages stored, the lower the reliability of the information in the older stored messages due to the age of that information.

The Base Station 201 makes a power control (PC) decision for each Remote Station. That is, the Base Station 201 determines whether the Remote Station 207A is transmitting the Reverse Link with too much or too little power (STEP 301). In accordance with one disclosed method, this determination is based on the error rate of the Reverse Link 213. In another disclosed method, this determination is based upon a C/I measurement of the Reverse Link. Those skilled in the art will understand that there are many other ways in which the Base Station can determine whether the Remote Station has transmitted the information over the Reverse Link with an appropriate amount of power to be reliably received by the Base Station, but without using more power than is required. Accordingly, any known means may be used for making this determination in accordance with the disclosed method and apparatus.

If the power that is being sent on the Reverse Link 213 is appropriate, (STEP 302), then no power is allocated to the RLPC Channel associated with the Remote Station 207A from which the Reverse Link 210 originated (STEP 304). The power is appropriate if the Base Station 201 determines that the power level of the Reverse Link should not be adjusted. This condition is referred to as an Erasure. If the Base Station determines that the Remote Station is transmitting with either too little, or too much power, then a change in the amount of power is required on the Reverse Link 213 (i.e., an erasure does not occur) (STEP 302). In such a case, the Base Station 201 determines whether the most recently received data rate control message (i.e., the "Current" DRC message) is "Valid" from the Remote Station 207A. A DRC is considered to be Valid if the DRC message content is received by the receiving Base Station with a predetermined level of assurance in the accuracy of the message content. The Base Station 207a also determines whether the Current DRC message is "Directed" to the Base Station 201 (STEP 306). The DRC message is Directed to a particular Base Station if the DRC message provides information about the rate at which the transmitting Remote Station can receive information from that Base Station. The information may be provided in any manner, such as a measure of the quality of the Forward Link, or the actual data rate that can be supported by the Forward link. It should be noted that in accordance with one embodiment of the disclosed method and apparatus, each Remote Station transmits DRC messages at a predetermined rate. Each DRC message indicates the Remote Station from which the DRC message came. If a DRC message is Valid and Directed to the Base Station that receives that DRC message during a first period of time, then the DRC message is a relatively good indication of the quality of the Forward Link between the Remote Station that transmitted the DRC message and the Base Station that received the message. If a DRC message which is transmitted during a second time period is either not received as Valid by the Base Station 201, or is not directed to the Base Station 201, then there is no way to determine the quality of the Forward Link during that second period of time.

Therefore, if the Current DRC message is Valid and Directed to the Base Station 201, then the Base Station 201 uses the content of that message to determine the quality (e.g., the C/I) of the Forward Link 208 (STEP 308). In accordance with one embodiment of the disclosed method and apparatus, the quality determination is based on the data rate that is being requested by the Remote Station 207A. The Base Station 201 uses the inverse of the process used by the Remote Station 207A to determine the data rate from the C/I of the Pilot Channel of the Forward Link 208. In addition, the Base Station 201 identifies the quality determination of the Forward Link 208 as being "Reliable" (STEP 308). The quality determination is identified as being Reliable due to the fact that the DRC message was both Valid and Directed to the Base Station 201.

Once the Base Station 201 has established a quality value for the Forward Link 208, the Base Station 201 checks whether the quality of the Forward Links 215 and 217 to each of the other Remote Stations 207B and 207C that include the Base Station 201 in the Active Set has been determined (STEP 342) (see FIG. 3c). As noted above, DRC messages are transmitted on each Reverse Link associated with a RLPC Channel. That is, DRC messages are transmitted by each of the three Remote Stations 207A, 207B, and 207C that include the Base Station 201 in the Active Set. If the Base Station 201 has not yet determined the quality of all three Forward Links 208, 215, and 217, then the Base Station 201 continues the process at STEP 301 in order to determine the quality of the next Forward Link (STEP 344). Once the quality of each Forward Link 208, 215, and 217 associated with each RLPC Channel has been determined, the Base Station 201 allocates power to each RLPC Channel based on the quality determinations and the reliability of those determinations, as will be described in greater detail below.

If the Current DRC message is either invalid or not Directed to the Base Station 201 (STEP 306), then in accordance with one embodiment of the disclosed method and apparatus, the Base Station gets the DRC messages stored on the Short List (STEP 310). A determination is made as to whether any of the most recent DRC messages were Directed to the Base Station 201 from the Remote Station 207A (STEP 312). If at least one Valid DRC message on the Short List is Directed to Base Station 201, then the Base Station 201 determines the quality (e.g., the C/I) of the Forward Link 208 based on the value of the most recent Valid DRC message directed to the Base Station 201 and stored in the Short List (STEP 314). As was the case in STEP 308, the Base Station 201 determines that the quality determination of the Forward Link is Reliable. This determination is made based on the results of STEP 312. However, in the case of STEP 314, the DRC message is not the Current DRC message. Therefore, in accordance with one embodiment of the disclosed method and apparatus, the quality value is adjusted to compensate for the fact that the DRC message is not Current.

For example, in the case in which quality is expressed as a C/I value, the C/I value is adjusted either up or down to compensate for the fact that the data rate information is not Current. In accordance with one embodiment, the C/I value associated with a Remote Station from which no Current DRC message is available is adjusted to reflect a greater signal quality. The quality of the Forward Link will determine the amount of power allocated to the RLPC Channel. Signals transmitted over lower quality links are transmitted with more power, while signals transmitted over higher quality links are transmitted with less power. Therefore, adjusting the quality value to indicate a higher quality link results in less power being allocated to the RLPC Channel associated with the Remote Station 207A from which no Current DRC message directed to that Base Station is available. This results in more power being available for the RLPC Channel associated with the Remote Station from which the Base Station has received a Current DRC message directed to that Base Station.

Alternatively, since the Base Station 201 has received a DRC message that was Directed to the Base Station 201 relatively recently (as indicated by the fact that such a message is on the Short List) the Base Station 201 may adjust the quality value downward. Such an adjustment would result in more power being allocated to the RLPC Channel associated with that Remote Station 207A. This is appropriate if there is a desire to increase the possibility that the RLPC Channel will be reliably received by the Remote Station 207A. As noted above, there is a limited amount of total power available to transmit all of the RLPC Channels. Therefore, increasing the amount of power with which a RLPC Channel is transmitted to one Remote Station decreases the amount of power that is available to transmit RLPC Channels to the other Remote Stations.

In yet another embodiment of the disclosed method and apparatus, the Base Station 201 does not adjust the quality determination at all. By not adjusting the quality determination, an assumption is made that the benefits of providing more power to those RLPC Channels for which the quality is well known, are offset by the desire to provide a measure of reliability for the transmission of those RLPC Channels for which the quality is not as well known.

Having determined a quality value for the Forward Link 208 in STEP 314, the Base Station 201 checks whether the quality of all of the Forward Links has been determined (STEP 342) and if not, the process returns to STEP 301 (STEP 344).

If the Base Station 201 determines that none of the DRC messages on the Short List is Directed to the Base Station (STEP 312), then the Base Station 201 determines whether at least one Valid DRC message was received within a predetermined amount of time (such as 400 milliseconds in one particular example of the disclosed method and apparatus). In one embodiment of the disclosed method, a "DRC-LOCK bit" is set when a Valid DRC message arrives. The DRC-LOCK bit indicates that the Base Station 201 has received a Valid DRC message over the Reverse Link 210 from a Remote Station within the predetermined period of time (STEP 316). The predetermined time period is preferably greater than the amount of time over which DRC messages are stored in the Short List, and equal to the amount of time over which the DRC messages are stored in the Long List. It should be noted that the Base Station 201 may also determine whether a Valid DRC message was received by any other means. For example, a determination can be made as to whether any Valid DRC messages are present in the Long List by inspection of the stored DRC messages.

Accordingly, if the Base Station 201 has received a Valid DRC messages within a predetermined amount of time, then such messages will have been stored on the Long List. The Base Station gets the DRC messages from the Long List. If any of the DRC messages in the Long List are Directed to the Base Station 201 (STEP 320), then in accordance with one embodiment of the disclosed method, the Base Station 201 calculates the average of the quality values from all of the DRC messages Directed to the Base Station 201. The Base Station then determines the quality (e.g., the C/I) of the Forward Link 208 based on the average of all of the DRC message values (STEP 322). As was the case in STEP 308, the Base Station 201 identifies the quality determination of the Forward Link as Reliable based on the determination made in STEP 320 and establishes a value for the quality of the Forward Link (STEP 322).

Having determined the quality of the Forward Link 208, the Base Station 201 checks whether the quality of all of the Forward Links has been established (STEP 342) and if not, the process returns to STEP 301 (STEP 344).

If a determination is made that no Valid DRC messages have been received by the Base Station 201 within the predetermined period (STEP 316), or that none of the DRC messages was Directed to the Base Station 201 (STEP 320), then the Base Station 201 will attempt to determine the quality of the Forward Link based upon DRC messages that were not Directed to the Base Station 201. However, the Base Station 201 will consider this quality determination to be "Unreliable" since it is based on information that is not Directed to the Base Station 201.

Assuming that none of the DRC messages received by the Base Station 201 were Directed to that Base Station 201 (as determined in STEP 316 or 320), then the Base Station 201 determines whether the Current DRC message is Valid (STEP 324). If the Current DRC message is Valid, then the Base Station 201 establishes a quality value (such as a C/I value) for the Forward Link 208. One means by which that Base Station 201 establishes a quality value is by performing the inverse of the operation performed by the Remote Station 207A when that Remote Station 207A generated the Current DRC message. The quality value is then modified to correct for the fact that the value is Unreliable. Alternatively, the value of the DRC message may be used directly (such as by reference to a lookup table) to determine the quality of the Forward Link 208.

In one embodiment of the disclosed method and apparatus, the Base Station 201 takes into account that the Forward Link 209 from the Base Station 203 to which the DRC messages are currently Directed has the highest quality. That is, Base Stations 201 and 205 to which the Remote Station 207A has not Directed DRC messages will have a Forward Link that has a lower quality than the Forward Link transmitted from the Base Station 203 to which the Remote Station 207A is directing DRC messages. This is because the Remote Station 207A always directs the DRC message to the Base Station having the highest quality Forward Link.

By performing the inverse of the operation performed by the Remote Station 207A to generate the DRC message, the Base Station 201 can determine the maximum quality of the Forward Link 208. Therefore, the Base Station 201 preferably determines that the quality of the Forward Link 208 is lower than the quality of the Forward Link 209, as determined from the value of the Current DRC message (STEP 326). However, this determination is considered to be Unreliable, since there is no way to know exactly how much lower the quality of the Forward Link 208 will be.

In one embodiment of the disclosed method and apparatus, the Base Station 201 determines how much to adjust the quality of the Forward Link 208 by taking into account additional information. Examples of such information include: (1) a stored table that cross-references the location of the Remote Station 207A to the quality of the Forward Link 208, (2) historical information regarding the quality of the Forward Link 208, and (3) other information that is indicative of the magnitude of the difference between the quality of the Forward Link 211 and 209 about which the information is relevant and the quality of the Forward Link 208 transmitted by the Base Station 201.

Having determined the quality of the Forward Link 208, the Base Station 201 checks whether the quality of all of the Forward Links has been established (STEP 342). If not, the process returns to STEP 301 (STEP 344).

If the Current DRC message is not Valid (STEP 324), then the Base Station 201 searches through the stored values in the Short List to identify the most recent Valid DRC message (STEP 328). If the Short List includes at least one Valid DRC message (STEP 330), then the Base Station 201 determines the quality of the Forward Link 208 based on the value of this most recent DRC message from the Short List. This quality determination is marked as being Unreliable (STEP 332) to indicate that quality determination was not made with regard to the Forward Link transmitted from that Base Station 201. Since the DRC message is not Directed to the Base Station 201, the quality determination is merely the maximum quality, and not the actual quality of the Forward Link 208. In addition, since the value is not from the Current DRC message, the value is made even more Unreliable (i.e., may not even be a reliable measure of the maximum quality). Therefore, in accordance with one embodiment of the disclosed method and apparatus, the value is preferably modified to indicate that the quality of the Forward Link 208 is less than the quality indicated by the value of the DRC message.

Having determined the quality of the Forward Link 208, the Base Station 201 checks whether the quality of all of the Forward Links has been established (STEP 342) and if not, the process returns to STEP 301 (STEP 344).

If none of the DRC messages in the Short List were Valid (STEP 330), then the Base Station 201 checks to see whether any of the values in the Long List are Valid (STEP 334). If the Base Station 201 has been receiving DRC messages, then the Base Station 201 reads the DRC messages stored in the Long List (STEP 336). The Base Station 201 determines the quality of the Forward Link 208 based on the DRC messages that are Valid (STEP 338). However, if none of the DRC messages in the Long List have been directed to the Base Station 201, then in accordance with one embodiment of the disclosed method and apparatus, the stored DRC messages are taken together to indicate the average quality of the Forward Link 208. Typically, when the DRC messages are both old and have not been Directed to the Base Station 201, each individual DRC message value has relatively little significance. This is especially true since the quality of the Forward Link 208 changes relatively quickly. Once the average value is determined, the quality of the Forward Link 208 can be estimated to be worse than this estimate, since none of these values were Directed to the Base Station 201. Therefore, the estimation is marked as Unreliable (STEP 338).

Having determined the quality of the Forward Link 208, the Base Station 201 checks whether the quality of all of the Forward Links has been established (STEP 342). If not, the process returns to STEP 301 (STEP 344).

If there are no Valid DRC messages in the Long List (STEP 334), then the Base Station 201 assumes the quality of the Forward Link 208 to be a predetermined value (STEP 340). In one embodiment of the disclosed method and apparatus, the predetermined value is an average value taken over a longer period than is represented by the Long List. Alternatively, the value may be a parameter stored in the Base Station and set by system considerations, such as topography, average quality of the Forward Link within an area of interest, etc.

Having determined the quality of the Forward Link 208, the Base Station 201 checks whether the quality of all of the Forward Links has been established (STEP 342). If not, the process returns to STEP 301 (STEP 344).

In accordance with one embodiment of the disclosed method and apparatus, for Forward Link 208 for which the quality determination was considered to be Reliable, the C/I value will not be further adjusted to compensate for reliability. That is, the C/I value that will be used by the Base Station 201 will be essentially equal to the C/I value that was measured by the Remote Station 207A. However, in accordance with an alternative embodiment of the disclosed method and apparatus, the C/I value will be modified by a factor which is a function of packet length, level of confidence on the prediction, fading margin, and other such factors that can affect the correlation between the value and the actual quality of the Forward Link 208.

Upon determining a quality factor for each Forward Link, the amount of power that is to be allocated to each of the RLPC Channels is first divided among those RLPC Channels for which Reliable quality information is available. This allocation is based upon the amount of power required in light of the quality of each such RLPC Channel (STEP 346). Next, the total power that is to be allocated according to the requirements of all of the RLPC Channels for which Reliable information is available is compared to the total power available for all of the RLPC Channels (STEP 348). If the amount of power required for all of the Reliable RLPC Channels is more than the total power available, then the available power is divided among only those RLPC Channels for which Reliable quality information is available, based on the relative quality of each such Reliable Channel (STEP 350). This introduces an equal degradation among all RLPC Channels for which reliable quality information is available.

If the amount of power required for each Reliable RLPC Channel is less than the total power available (STEP 348), then the remaining power is divided among those RLPC Channels for which only Unreliable quality information is available (STEP 352).

In the embodiment of the disclosed method and apparatus in which the measure of the quality of a Forward Link is the C/I value, the following formula is used to determine the amount of power required to transmit the Forward Link (STEP 346):

$$A[i] = (E_b/N_o) \cdot PG^{-1} \cdot (1/CtoI[i]) \qquad \text{equation (1)}$$

where $E_b/N_o$ is the energy per bit divided by the noise, PG is the processing gain due to the encoding of the information, and CtoI[i] is the sum of all C/I values for the particular RLPC Channel for which a Reliable C/I value has been determined, A[i] is the amount of power required to transmit the RLPC Channel for the RLPC Channel having the CtoI[i] value.

Once the values for each A[i] have been calculated (i.e., an output power level has been calculated for each Forward Link for which reliable quality information is available), a check is made to ensure that the total output power allocated to all of the RLPC Channels does not exceed the maximum that the Base Station 201 can transmit, taking into account any additional power required in the RLPC Channels for overhead (such as forward activity bits or other such overhead messages).

If the total power allocated by equation (1) to the RLPC Channels directed to Remote Stations over Forward Links for which Reliable quality determinations can be made is greater than the amount of power that is available, then in accordance with one embodiment of the disclosed method and apparatus, the power is allocated to those RLPC Channels for which a Reliable quality determination has been made according to the following formula:

$$A[i] = \{(CtoI[i]^{-1})/\Sigma(CtoI[j]^{-1})\}(1-P_{overhead}) \qquad \text{equation (2)}$$

where CtoI[i] is the C/I value of the Forward Link to the Remote Station to which the RLPC Channel to be allocated power A[i] is directed and CtoI[j] is the sum of the C/I values of each of the other RLPC Channels for which Reliable C/I values have been determined. No power is allocated to RLPC Channels for which Unreliable quality determinations have been made. Accordingly, the power is allocated among the RLPC Channels for which Reliable quality information is available in proportion to the quality of each such RLPC Channel.

If the total power allocated by equation (1) is less than the amount of power that is available, then in accordance with one embodiment of the disclosed method and apparatus, the following formula is used to allocate the power among the RLPC Channels:

$$A[k] = \{(CtoI[k]^{-1})/\Sigma(CtoI[l]^{-1})\}\{(1-P_{overhead})-\Sigma A[j]\} \quad \text{equation (3)}$$

where CtoI[k] is determined to be an Unreliable C/I value determined for the Forward Link to the Remote Station to which the RLPC Channel to be allocated power A[k] is directed, $\Sigma(CtoI[l]$ is the sum of the other C/I values associated with the RLPC Channels for which Unreliable C/I values have been determined, and $\Sigma A[j]$ is the sum of the C/I values of each of the other RLPC Channels for which Reliable C/I values have been determined. Accordingly, once the power allocated to the RLPC Channels for which Reliable quality information is available, the remainder is allocated to the RLPC Channels for which only Unreliable quality information is available. The remaining power is allocated in proportion to the estimates of the quality of each RLPC Channel for which only Unreliable quality information is available.

In one embodiment of the disclosed method and apparatus, the C/I value may be adjusted to compensate for a lack of Reliability in the determination of the C/I at the Remote Station 207a, or to otherwise alter the allocation of power between RLPC Channels transmitted over the Forward Link 208. It should be noted that both the quality of the Forward Link, as well as the reliability of the quality determination, are used in determining how to allocate power among the RLPC Channels. It should also be noted that in accordance with one embodiment of the disclosed method and apparatus, RLPC Channels are transmitted to all of the Remote Stations, and each Slot (each RLPC Channel is modulated onto a separate Code Channel 102a and 102b). Therefore, regardless of the particular Remote Station to which the forward channel is currently being transmitted, RLPC Channels will be included that are intended to be received by each of the Remote Stations to which the Base Station 201 may transmit (i.e., each Remote Station that includes the Base Station 201 in the Active Set).

Figure 4:
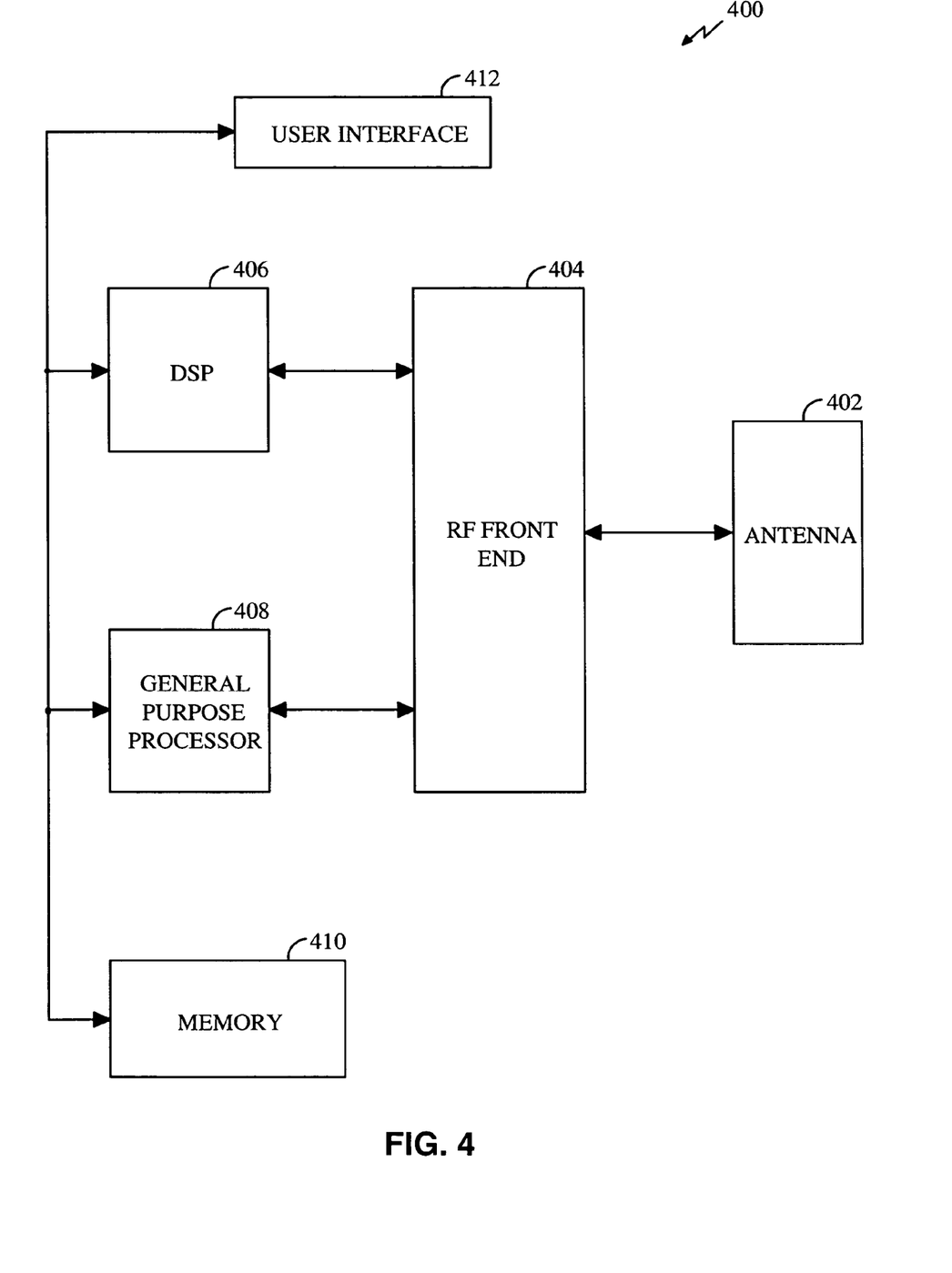
FIG. 4 is a block diagram of a remote station in accordance with one embodiment of the disclosed apparatus.

It will be understood by those skilled in the art that the disclosed method is preferably essentially implemented as an executable software application that is executed by a programmable device. FIG. 4 is a block diagram of a Remote Station 400 in accordance with one embodiment of the disclosed apparatus. The Remote Station 400 includes an antenna 402, a radio frequency (RF) front end 404, a digital signal processor (DSP) 406, a general purpose processor 408, a memory device 410, and user interface 412.

In accordance with the disclosed method and apparatus, the antenna 402 receives Forward Link signals from one or more Base Stations. The signals are appropriately amplified, filtered and otherwise processed by the RF front end 404. The output from the RF front end 404 is then applied to the DSP 406. The DSP 406 decodes the received Forward Link signals. In addition, DSP 406 provides an indication as to the relative quality of the received Forward Link. The indication of relative quality is stored in the memory 410. The general purpose processor 408 is coupled to the DSP 406 and to the memory 410. The general purpose processor 408 reads the indications of relative quality from the memory 410 and determines the rate at which each received Forward Link can support data, and determines which Forward Link can support the highest data rate. Once the general purpose processor 408 has selected the Forward Link that can support the highest data rate, the general purpose processor 408 communicates the selection to the DSP 406. The DSP 406 encodes and modulates the information in a DRC, together with any information from the user interface 412, into a Reverse Link output signal that is provided to the RF front end 404. The RF front end processes the Reverse Link output signal and couples the Reverse Link output signal to the antenna for transmission to each Base Station capable of receiving the signal.

Figure 5:
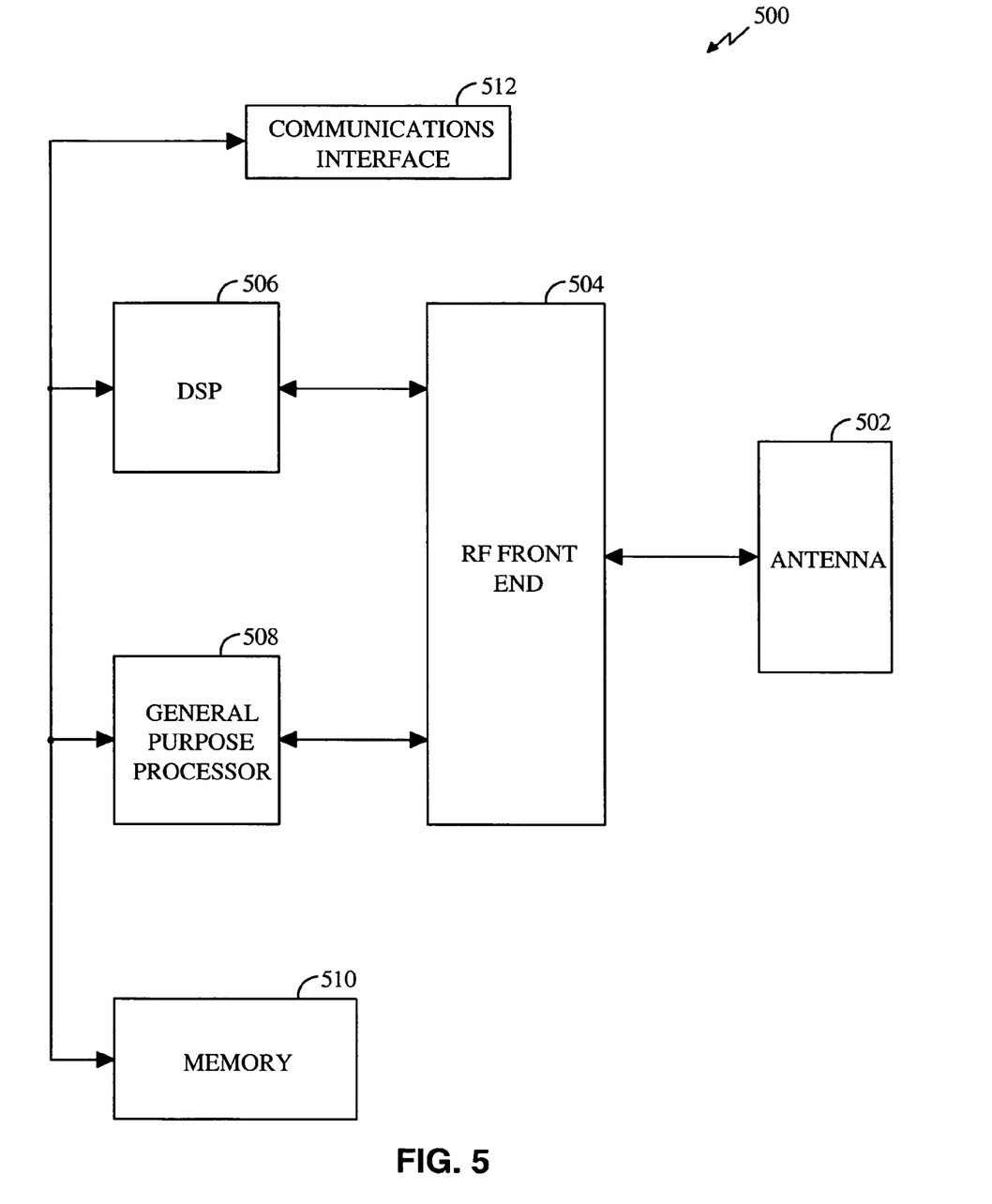
FIG. 5 is a block diagram of a base station in accordance with one embodiment of the disclosed apparatus.

FIG. 5 is a block diagram of a Base Station 500 in accordance with one embodiment of the disclosed apparatus. The Base Station 500 includes a transmitter, such as an antenna 502 and a radio frequency (RF) front end 504. The Base Station 500 further includes a digital signal processor (DSP) 506, a general purpose processor 508, a memory device 510, and a communication interface 512.

In accordance with the disclosed apparatus, the antenna 502 receives Reverse Link signals that have been transmitted from nearby Remote Stations 400. The antenna couples these received signals to an RF front end 504 which filters and amplifies the signals. The signals are coupled from the RF front end 504 to the DSP 506 and to the general purpose processor 508 for demodulation, decoding, further filtering, etc. Upon decoding DRCs from the received Reverse Link signals, the DSP 506 stores the decoded DRC in the memory 510 in both the Short List and the Long List. In addition, the DSP 506 determines whether each received Reverse Link was transmitted from the Remote Station with too much or too little power. It should be noted that the Base Station 500 typically receives Reverse Link signals from more than one Remote Station 400 at a time.

The general purpose processor 508 then performs the process shown in FIGS. 3A–3C. The general purpose processor 508 communicates to the DSP 506 the amount of power that should be allocated to each RLPC Channel. Based upon the allocation of power to each RLPC Channel, the DSP 506 modulates and encodes the Forward Link signals to be transmitted by the Base Station 500. The signal is coupled to the RF front end 504. The RF front end couples the signal from the antenna 502 which transmits the Forward Link signal to the Remote Stations.

The disclosed method and apparatus is provided to enable any person skilled in the art to make or use the present invention. The various modifications to the disclosed method and apparatus will be readily apparent to those skilled in the art, and the generic principles defined herein may be applied to other embodiments without the use of inventive faculty. Thus, the present invention is not intended to be limited to the methods and apparatuses shown herein but is to be accorded the widest scope consistent with the claims set forth below.

What is claimed is:

1. An apparatus for allocating power among reverse link power control channels on a communications link between a first station and a plurality of second stations, comprising:

means for attempting to receive forward link quality information from each of the plurality of second stations;

means for determining the relative quality of a plurality of reverse link power control channels, each such reverse link power control channel being associated with one of the plurality of second stations, the determination being based upon the forward link quality information received from the associated second stations; and means for allocating more power to a reverse link power control channel associated with a lower quality forward link than to a reverse link power control channel associated with a higher quality forward link.

2. An apparatus for allocating power to a power control channel which is embedded within a data channel, comprising:

means for determining the amount of power that is required to reliably transmit information over the power control channel to each of a plurality of remote stations;

means for allocating the amount of power required to transmit the power control channel to each of the remote stations based upon the determined power requirements; and means for allocating the amount of power required to transmit each data channel based on the total number of data channels and the total available power, independent of the amount of power allocated to each power control channel.

3. An apparatus for determining the amount of power that is required to transmit power control information from a first station to a second station of a communication system, comprising:

means for receiving a first data rate control message from the second station during a first period of time;

means for determining whether the first data rate control message is directed to the first station;

means for storing the first data rate control message on a short list;

means for receiving a second data rate control message from the second station during a second period of time;

means for determining whether the second data rate control message is directed to the first station;

means for determining the amount of power which would be required to transmit power control information from the first station to the second station during the first period of time based upon the first data rate control message if the second data rate control message is not directed to the first station; and means for determining the amount of power that is required to reliably transmit power control information from the first station to the second station during the second period of time based upon the amount of power determined to be required to reliably transmit power control information from the first station to the second station during the first period of time.

4. The apparatus of claim 3, further comprising:

means for storing the second data rate control message on the short list;

means for storing data rate control messages on the short list if received within a first predetermined amount of time, and storing data rate control messages on a long list if received within a second predetermined amount of time, the second predetermined amount of time being longer than the first predetermined amount of time;

means for determining whether any of the messages on the short list are directed to the first station;

means for determining the amount of power required to transmit the power control information from the first station to the second station based upon the most recent data rate control message directed to the first station if any of the data rate control messages stored on the short list are directed to the first station;

means for determining the amount of power required to reliably transmit power control information from the first station to the second station during the second period of time based upon each of the power control messages directed to the first station and stored on the long list if none of the data rate control messages stored on the short list are directed to the first station and at least one of the data rate control messages stored on the long list are directed to the first station.

5. The apparatus of claim 4, wherein the means for determining the amount of power required to reliably transmit power control information from the first station to the second station during the second period of time based upon each of the power control messages directed to the first station and stored on the long list further comprises:

means for calculating an average forward link quality based upon the values of each data rate control message stored on the long list and directed to the base station; and means for determining the amount of power required to reliably transmit power control information from the first station to the second station based upon the average forward link quality.

6. An apparatus for allocating power among reverse link power control channels on a communications link between a first station and a plurality of second stations, comprising:

means for attempting to receive forward link quality information from each of the plurality of second stations;

means for determining the relative quality of a plurality of reverse link power control channels, each such reverse link power control channel being associated with one of the plurality of second stations, the determination being based upon the forward link quality information received from the associated second stations;

means for allocating more power to a reverse link power control channel associated with a lower quality forward link than to a reverse link power control channel associated with a higher quality forward link;

means for determining from information received from one of the plurality of second stations whether more power, less power, or the same amount of power is required on the forward link between the one of the plurality of second stations and the first station; and means for allocating no power to a reverse power control channel associated with one of the plurality of second stations communicating with the first station over a forward link for which the same amount of reverse link power is required.

* * * * *